United States Patent
O'Brien et al.

(10) Patent No.: US 9,413,156 B2
(45) Date of Patent: Aug. 9, 2016

(54) SYSTEM FOR DETECTING A FALLING ELECTRIC POWER CONDUCTOR AND RELATED METHODS

(71) Applicant: SAN DIEGO GAS & ELECTRIC COMPANY, San Diego, CA (US)

(72) Inventors: William O'Brien, La Jolla, CA (US); Eric A. Udren, Pittsburgh, PA (US)

(73) Assignee: San Diego Gas & Electric Company, San Diego, CA (US)

( * ) Notice: Subject to any disclaimer, the term of this patent is extended or adjusted under 35 U.S.C. 154(b) by 455 days.

(21) Appl. No.: 13/952,433

(22) Filed: Jul. 26, 2013

(65) Prior Publication Data

US 2014/0028116 A1    Jan. 30, 2014

Related U.S. Application Data

(60) Provisional application No. 61/676,828, filed on Jul. 27, 2012, provisional application No. 61/712,602, filed on Oct. 11, 2012, provisional application No. 61/798,694, filed on Mar. 15, 2013.

(51) Int. Cl.
*H01H 83/00* (2006.01)
*H02H 3/28* (2006.01)
(Continued)

(52) U.S. Cl.
CPC . *H02H 3/02* (2013.01); *H02H 3/04* (2013.01); *H02H 3/26* (2013.01); *H02H 3/265* (2013.01); *H02H 3/32* (2013.01); *H02H 3/325* (2013.01); *H02H 3/353* (2013.01); *H02H 3/38* (2013.01);
(Continued)

(58) Field of Classification Search
CPC ............. H02H 3/02; H02H 3/04; H02H 3/26; H02H 3/265; H02H 3/32; H02H 3/325; H02H 3/353; H02H 3/38; H02H 3/422; H02H 3/44; H02H 3/46; H02H 3/48; H02H 7/261; H02H 7/28; Y10T 307/826; Y10T 307/858; Y10T 307/865
USPC .......................................... 307/125, 130, 131
See application file for complete search history.

(56) References Cited

U.S. PATENT DOCUMENTS 2,879,453 A    3/1959    Hodges et al.
3,970,898 A    7/1976    Baumann et al.
(Continued)

FOREIGN PATENT DOCUMENTS

EP    1603211 A1    12/2005
JP    08-228432 A    9/1996
(Continued)

OTHER PUBLICATIONS

International Search Report from corresponding International Application No. PCT/US2013/052365 filed Jul. 26, 2013 (3 pages).
(Continued)

*Primary Examiner* — Hal Kaplan
(74) *Attorney, Agent, or Firm* — Klein, O'Neill & Singh, LLP (57) ABSTRACT

Methods and systems for detecting a falling power line in a power transmission or distribution system are described. Electrical measurements at various points in the power distribution system are used to detect changes in a power line indicating that the conductor has broken or become disconnected. Upon detection, control mechanisms are used to deenergize the conductor while the conductor is falling and/or before it contacts the ground.

29 Claims, 7 Drawing Sheets (51) Int. Cl.
*H02H 3/38* (2006.01)
*H02H 3/44* (2006.01)
*H02H 3/02* (2006.01)
*H02H 3/04* (2006.01)
*H02H 3/26* (2006.01)
*H02H 7/26* (2006.01)
*H02H 7/28* (2006.01)
*H02H 3/32* (2006.01)
*H02H 3/353* (2006.01)
*H02H 3/42* (2006.01)
*H02H 3/46* (2006.01)
*H02H 3/48* (2006.01)

(52) U.S. Cl.
CPC .............. *H02H 3/422* (2013.01); *H02H 3/44* (2013.01); *H02H 3/46* (2013.01); *H02H 3/48* (2013.01); *H02H 7/261* (2013.01); *H02H 7/28* (2013.01); *Y02E 60/728* (2013.01); *Y04S 10/265* (2013.01); *Y10T 307/826* (2015.04); *Y10T 307/858* (2015.04); *Y10T 307/865* (2015.04)

(56) References Cited

U.S. PATENT DOCUMENTS

| | | |
|---|---|---|
| 4,027,203 A | 5/1977 | Moran et al. |
| 4,158,810 A | 6/1979 | Leskovar |
| 4,196,463 A | 4/1980 | Dickerson |
| 4,725,914 A | 2/1988 | Garitty |
| 4,758,962 A | 7/1988 | Fernandes |
| 4,855,671 A | 8/1989 | Fernandes |
| 4,884,034 A | 11/1989 | Guzman |
| 5,181,026 A | 1/1993 | Granville |
| 5,245,498 A | 9/1993 | Uchida et al. |
| 5,303,112 A | 4/1994 | Zulaski et al. |
| 5,341,265 A | 8/1994 | Westrom et al. |
| D365,030 S | 12/1995 | Benesh et al. |
| 5,481,194 A | 1/1996 | Schantz et al. |
| D369,779 S | 5/1996 | Venditti |
| 5,565,783 A | 10/1996 | Lau et al. |
| 5,625,236 A | 4/1997 | Lefebvre et al. |
| 5,786,683 A | 7/1998 | Williams |
| 6,002,260 A | 12/1999 | Lau et al. |
| 6,008,971 A | 12/1999 | Duba et al. |
| 6,347,027 B1 | 2/2002 | Nelson et al. |
| 6,369,996 B1 | 4/2002 | Bo |
| 6,459,998 B1 | 10/2002 | Hoffman |
| 6,496,342 B1 | 12/2002 | Horvath et al. |
| 6,677,743 B1 | 1/2004 | Coolidge et al. |
| 6,788,508 B2 | 9/2004 | Papallo, Jr. et al. |
| 6,940,702 B2 * | 9/2005 | Kojovic ............. H02H 7/0455 361/115 |
| 6,963,197 B1 | 11/2005 | Feight et al. |
| 7,043,340 B2 | 5/2006 | Papallo et al. |
| 7,282,921 B2 | 10/2007 | Sela et al. |
| D562,258 S | 2/2008 | Nakao et al. |
| 7,339,466 B2 | 3/2008 | Mansfield et al. |
| 7,391,313 B2 | 6/2008 | Roark et al. |
| 7,400,150 B2 | 7/2008 | Cannon |
| D600,287 S | 9/2009 | Oikawa et al. |
| 7,630,863 B2 | 12/2009 | Zweigle et al. |
| 7,698,582 B2 | 4/2010 | Qin et al. |
| 7,755,872 B2 | 7/2010 | Ortega |
| D648,642 S | 11/2011 | Wallaert et al. |
| 8,077,049 B2 | 12/2011 | Yaney et al. |
| 8,275,486 B2 | 9/2012 | Schweitzer, III et al. |
| 8,760,996 B2 * | 6/2014 | Berkowitz ............ H02H 7/30 370/216 |
| 2004/0027748 A1 | 2/2004 | Kojovic et al. |
| 2005/0040809 A1 | 2/2005 | Uber, III et al. |
| 2007/0285857 A1 | 12/2007 | Berkowitz et al. |
| 2008/0122642 A1 | 5/2008 | Radtke et al. |
| 2008/0238436 A1 | 10/2008 | Bickel |
| 2008/0278871 A1 | 11/2008 | Shaak et al. |
| 2009/0256576 A1 | 10/2009 | Weems, II et al. |
| 2010/0007354 A1 | 1/2010 | Deaver, Sr. et al. |
| 2010/0134117 A1 | 6/2010 | Dzafic |
| 2012/0014020 A1 | 1/2012 | Lehmann |
| 2012/0046891 A1 | 2/2012 | Yaney et al. |
| 2012/0120790 A1 | 5/2012 | Berkowitz et al. |
| 2012/0146656 A1 | 6/2012 | Hara et al. |

FOREIGN PATENT DOCUMENTS

| | | |
|---|---|---|
| JP | 2004-053554 A | 2/2004 |
| WO | WO 80/00050 | 1/1980 |
| WO | WO 89/05535 | 6/1989 |
| WO | WO 94/01910 | 1/1994 |
| WO | WO 99/43066 | 8/1999 |
| WO | WO 00/48284 | 8/2000 |
| WO | WO 00/48288 | 8/2000 |
| WO | WO 01/04645 A1 | 1/2001 |
| WO | WO 02/09058 A1 | 1/2002 |
| WO | WO 2004/008600 A2 | 1/2004 |
| WO | WO 2004/073131 A1 | 8/2004 |
| WO | WO 2006/025870 A2 | 3/2006 |
| WO | WO 2006/078869 A2 | 7/2006 |
| WO | WO 2008/018941 A3 | 2/2008 |
| WO | WO 2008/146358 A1 | 12/2008 |
| WO | WO 2010/015334 A1 | 2/2010 |
| WO | WO 2010/115474 A1 | 10/2010 |
| WO | WO 2011/134851 A1 | 11/2011 |

OTHER PUBLICATIONS

Written Opinion from corresponding International Application No. PCT/US2013/052365 filed Jul. 26, 2013 (7 pages).
Extended European Search Report from European Patent Office on co-pending EP application (EP13823308.5) dated Mar. 29, 2016.
"Effects of Agricultural Fires on the Performance of Overhead Transmission Lines", IEEE Transactions on Power Delivery, vol. 5, No. 2, Apr. 1, 1990. (8 sheets).

\* cited by examiner

SYSTEM FOR DETECTING A FALLING ELECTRIC POWER CONDUCTOR AND RELATED METHODS

FIELD OF ART

Aspects of the present disclosure relate to fault anticipation or detection in or as part of a power grid, and more particularly to methods and systems for using measurements to detect changes in a power line indicating that the power transmission or distribution conductor has broken or become disconnected. Further aspects of the present device, system, and method include control mechanisms to deenergize the conductor while the conductor is falling and/or before it contacts the ground or other objects. Still further aspects of the present device, system, and method include control mechanisms for detecting a disconnected conductor and de-energizing the disconnected conductor.

BACKGROUND

An overhead high-voltage electric power distribution conductor may, for a variety of reasons (e.g., pole knocked over, tree fall, pole mounted conductor clamp failure, etc.), become detached or damaged and may fall to the ground while it remains energized, resulting in a ground fault. As the live conductor contacts the ground, it produces electrical arcing. The arcing can ignite flammable materials or vegetation and start a fire, and the flow of electric current may electrocute a person or animal in the vicinity of the fallen conductor. In addition, the zone of personal risk can expand to those standing nearby and to those who touch the victims, such as in an attempt to aid the victims.

Existing electrical protective systems and methods frequently fail to detect that a live conductor has contacted the ground. In favorable situations (e.g., high earth conductivity) where existing methods do detect the disconnected conductor on the ground, they do so only after the conductor has begun arcing on the ground, posing a high risk that a fire has already been ignited or persons nearby have been electrocuted.

Fallen-conductor ground faults, even when visibly dramatic at the site of ground contact, may not produce sufficiently distinguishable and detectable electrical measurement changes at the substation. Furthermore, even when the fault produces currents or signatures that can be detected, the detection and de-energization process may take relatively too long, in the order of 200 ms to several seconds or even minutes (several seconds to minutes is more typical). For every moment a live conductor arcs on the ground, fire or electrocution can occur.

BRIEF SUMMARY

A contribution to the art would include measuring devices that can detect a falling conductor situation at the moment it first occurs or shortly thereafter and trips a substation circuit breaker or circuit interrupting device and de-energize the hazardous circuit before the conductor falls to the ground resulting in a ground fault.

Aspects of the present disclosure provide for a system for detecting a falling conductor with an electrical measurement device (EMD) located away from the falling conductor, said system comprising: an electrical measurement device to measure a signal or signature at a location in a power transmission or distribution system and to determine whether the measured signal or signature is indicative of a falling conductor; and a communication device to send a status-change or control signal to one or more control devices, which can disconnect or isolate the electrical circuit section monitored by the electrical measurement device before the falling conductor reaches the ground or strikes an object. In an example, the electrical measurement device is associated with a radial power distribution circuit (energized from a utility substation source) and is downstream of the conductor to be measured. In another example, the electrical measurement device is associated with a radial power distribution circuit and upstream of the conductor to be measured. In another example, a plurality of electrical measurement devices are located throughout the power distribution system which may be radial, or which may have multiple sources of power generation from multiple utility substations connected at any moment, and/or may be energized from distributed energy resources along the circuit such as but not limited to photovoltaic (solar) arrays, wind turbines, small hydroelectric generators, combined heat and power (CHP) generation systems, customer-owned thermal generators, and energy-storing battery systems. Each of these electrical measurement devices is configured to detect specific changes, such as a signature that is indicative of a falling or separated conductor, and report its observations to a device, such as a controller, in another location that will evaluate locally measured and/or received changes from multiple locations for signs of conductor interruption or detachment.

In some aspects of the present system, device, and method, there is provided a system for detecting a falling conductor comprising: an electrical measurement device to measure a signature, such as voltages, currents, phase relationships, time behavior just before the apparent moment and after the moment of the disconnection to discern a difference, at a location in a power transmission or distribution system and generate a status change signal when the measured signature is indicative of a falling conductor; a communication device coupled to the electrical measurement device to receive the status change signal and transmit the status change signal; and a controller to receive the status change signal from the communication device and to control one or more switching devices to disconnect power from the section of the circuit that has experienced the disconnection before the falling conductor contacts the ground. As used herein, a switching device is broadly construed to mean any device that can open a circuit to deenergize power.

In some aspects of the present system, there is provided a system for detecting a signature indicative of a falling conductor comprising: an electrical measurement device to measure an electrical signature at a location in a power distribution system and to determine whether the measured electrical signature is below or above predetermined threshold values; said electrical measurement device is configured to generate a status change signal following detection of the electrical signature being below or above the predetermined threshold value; and a communication device to send the status change signal to one or more control devices to deenergize the portion of the circuit whose disconnection has been detected by the electrical measurement device. In some embodiments, the electrical measurement device is one of a voltage sensor, a current sensor, a phase sensor for sensing phase relationships, and a device for determining time behavior for a measurement just before the apparent event and a measurement just after the apparent event. Preferably, the measured signature has a value that is indicative of a falling or disconnected conductor.

In some aspects of the present disclosure, there is provided a system for detecting a signature on a conductor of a radial power distribution system with a downstream sensor comprising: a voltage sensor device to measure a voltage at a location in a power distribution system and to generate a status change signal indicating when the measured voltage is below a predetermined threshold voltage value that is equivalent to a value generated by a falling or disconnected conductor; a communication device coupled to the voltage sensor device to receive the status change signal and transmit the status change signal; and a controller to receive the status change signal from the communication device and to control one or more switching devices to disconnect power to downstream devices, downstream of the one or more switching devices. In an alternative embodiment, a similar detecting system is used on an electrical transmission system.

In yet other aspects, the disclosure provides a method for detecting a falling conductor, the method comprising: measuring an electrical signal at a designated location in a power distribution system or a power transmission system; and sending a status change signal to a control device at a remote location, the status change signal indicating a falling conductor at a point proximate or adjacent to the designated location.

In still yet other aspects of the present disclosure, there is provided a method for detecting a falling conductor, the method comprising: measuring an electrical signal, via an electrical signal measurement device, at each of a plurality of designated locations of a power distribution system or a power transmission system which may be energized from multiple sources of electrical energy; sending the measured electrical signal from the plurality of designated locations to one or more controllers; determining, via the one or more controllers, a relationship between at least two successive electrical signal measurement devices; comparing the measured electrical signals between the at least two successive electrical signal measurement devices to determine whether a voltage value, a current value, a phase relationship value, or a behavior change value comparison to determine if at least two successive readings at time 1 and time 2 are within a threshold or criteria; generating a status change signal if the value is outside the threshold or criteria; and controlling one or more switching devices to disconnect all sources of power from the portion of the circuit that has experienced the apparent disconnection. In another example, a status change signal is generated when the value is inside the threshold or criteria.

As understood, aspects of the present disclosure include devices, methods and systems for detecting a conductor that is falling or has separated from an electrical distribution or transmission system. The present disclosure is further understood to include devices, methods and systems for detecting a conductor that is falling or has separated from an electrical distribution or transmission system and de-energizing the conductor before it contacts the ground and create a ground fault. As further described herein, the method and system include using voltage magnitude checks, voltage phase relationship checks, current magnitude checks, current phase relationship checks, and determining whether the presence or absence of other operating signals like fault signatures and broadband arcing signatures to determine a falling or separated conductor condition.

These and other aspects of the invention are more fully comprehended upon review of this disclosure in view of the drawing figures.

BRIEF DESCRIPTION OF THE FIGURES

The foregoing features and other features of the disclosure will now be described with reference to the drawings of the various embodiments. In the drawings, the same components have the same reference numerals. The illustrated embodiments are intended to illustrate, but not to limit the disclosure.

DETAILED DESCRIPTION

The detailed description set forth below in connection with the appended drawings is intended as a description of the presently preferred embodiments of signature detection and deenergization systems and methods provided in accordance with aspects of the present disclosure, which are usable on either electrical distribution system, electrical transmission system, or both, and is not intended to represent the only forms in which the present device, system, and method may be constructed or utilized. The description sets forth the features and the steps for constructing and using the embodiments of the present device, system, and method in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
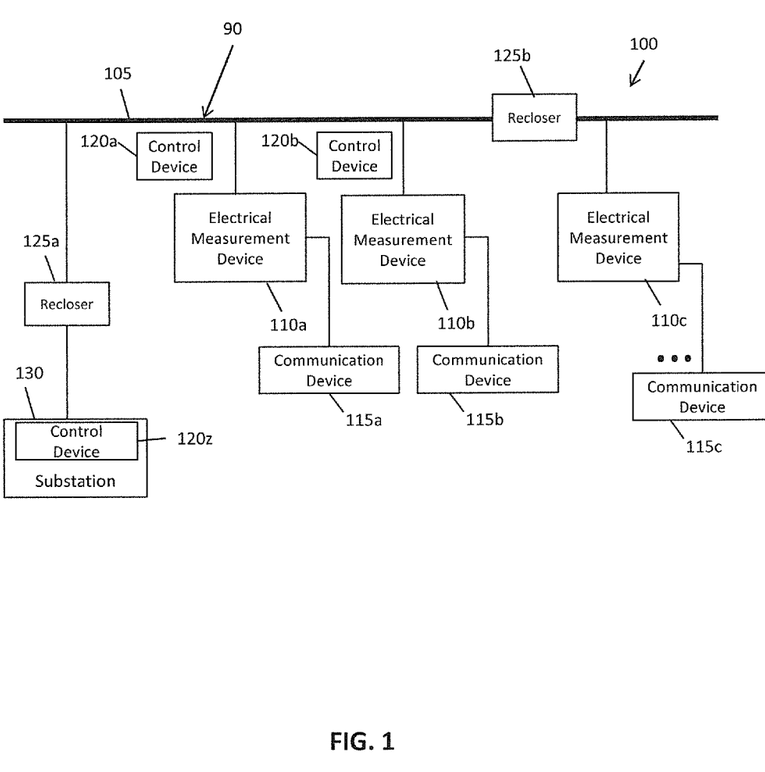
FIG. 1 is a block diagram of a power distribution system in accordance with aspects of the invention.

With reference now to FIG. 1, a block diagram illustrating a power distribution system 100 according to an embodiment of the present device, system, and method is shown, which may alternatively be viewed and applicable to a power transmission system. As shown, the power distribution system 100 may comprise an overhead power distribution circuit 90 tied to a substation 130; the substation 130 reduces voltage from transmission or sub-transmission lines. The overhead power distribution circuit 90 may be energized from a bus at the distribution substation 130 through a power circuit breaker 125a, which can be tripped by control or protection systems to deenergize the circuit within a short time period, in the order of approximately 50 milliseconds ("ms"). The distribution circuit also includes controllable devices along the circuit that can deenergize the portion of the circuit that is downstream of the device, such as recloser 125b in FIG. 1.

Distribution circuits may connect to loads or customers with on-site generation capability, such as that from photovoltaic arrays, wind powered generators, or internal combustion engines. These customer connections or generation sources include switching devices which may variously be controllable through communications to the utility, and/or according to local electrical measurement criteria defined by national equipment standards.

Transmission circuits and some distribution circuits may be energized from more than one utility substation at the same time, and such circuits may be energized from more than one location at the same time.

While the embodiment of FIG. 1 illustrates the most common configuration of electrical power distribution feeder, the present device, system, and method are fully applicable to power transmission lines and apparatus and to configurations in which energy is fed from more than one utility substation and to circuits that are energized from more than one location at the same time. Transmission lines typically operate at higher voltages, and connect two or more substations as compared to branching out from one substation to customers. Transmission lines and transmission substation power conductor paths are subject to falling conductor risks and the claimed methods of detection and deenergization before the conductor strikes the ground will mitigate risks of fire, electrocution, or electrical equipment damage from resulting short circuit faults.

In the embodiment shown, the power distribution system 100 includes a plurality of electrical measuring devices 110a . . . n, generically referred to as 110, and communications devices 115a . . . n, generically referred to as 115, wherein "a" through "n represent whole integers. As shown, there are three electrical measuring devices 110a-110c and three communications devices 115a-115c but the number can vary depending on the breadth or scope of the distribution system. For example, there can be four hundred or more electrical measuring and communications devices for a large power distribution system 100. In some embodiments, the electrical measurement or measuring devices 110a . . . n (EMDs) may each comprise, for example, a protective relay, a power meter, a recloser control device for actuating one or more reclosers, a capacitor bank controller, a voltage regulator, or a phasor measurement unit (PMU). The mechanism that enables a recloser to sense a change in current, select timing or other operation, time the tripping and reclosing functions, and lock out the circuit is provided by a recloser control device. Both an integral hydraulic recloser control type and an electronic recloser control type are contemplated. The electrical measuring devices 110a . . . n may be located at various locations in the power distribution system 100. For example, the electrical measurement devices or units 110a . . . n may be positioned at a substation, at or near a location of a recloser, at a power control device, at points near an end of a circuit branch or at any other convenient measurement or control location along the power distribution circuit 90.

In one example, the electrical measurement devices 110a . . . n are configured to measure electrical characteristics, signals, or signatures of the power transmission line or distribution conductor 105, such as voltage or current signal magnitudes, and/or their phase positions as compared to a shared standard time reference, at a location of the power distribution system 100. Further, the electrical measurement devices may be configured to generate a trip signal when the measured electrical characteristic is indicative of a signature that is generated when a conductor separates from the circuit or is falling. The measured signal or signature can be a fixed value or signal, a variable, a derived value, a calculated value, voltage signatures, current signatures, a time-based value, and/or a measured value. In some embodiments, for example, the electrical measurement devices may generate a trip signal when the measured signal is below a predetermined threshold, such as when the voltage or current signal matches a predetermined signature signal relationship criterion, which has or have been determined as having a high probability of a falling conductor or separated conductor. Thus, it is also possible to set a measured signal above a predetermined threshold, which is indicative of a falling conductor, for the measuring device to generate a trip signal. As used herein, a falling conductor, a broken conductor, or a separated conductor that has separated from the circuit 90 may be referred to generically as a problem conductor.

In some embodiments, the electrical measurement devices 110 may further include a processor. The term "processor" refers to one or more programmable general-purpose or special-purpose microprocessors, digital signal processors (DSPs), programmable controllers, application specific integrated circuits (ASICs), programmable logic devices (PLDs), or the like, or a combination of such hardware devices. The processor may be configured to execute instructions to compare electrical characteristics of the measured electrical signals with predetermined threshold values or measurement information received from other electrical measurement devices 110. For example, the processor can be programmed to compare signals from different measured points on the distribution system 100, compare differences between different sets of points, and compare upstream signals versus downstream signals to detect a signature in the system to then deenergize, such as to deactivate a recloser upstream of the problem conductor to deenergize the problem conductor, as further discussed below. Once a value is measured and determined to be indicative of a problem conductor, a signal indicative of that problem conductor is generated and then sent, via a communication device, to a remote controller to activate a breaker, recloser, switching device, or combinations thereof, to deenergize a section of the distribution circuit determined as problematic, such as possibly having a problem conductor.

The communication devices 115 are configured to communicate the measured signals to a processor or controller which will then determine further actions, if any. The communication devices may each comprise a point to point radio, nodes of a network radio system, or any high speed communication device configured to communicate via a wireless data network, wired or wireless Ethernet, serial communication network or optical fiber network or the like. For example, in one embodiment, the communication device may comprise a 2.3 GHz Worldwide Interoperability for Microwave Access (WiMax) radio networking device. In another embodiment, the communication device uses 4G LTE (fourth-generation long-term evolution) technology. The communication devices 115 may be provided within the electrical measurement devices 110 or may be provided separately. As faster and more reliable communication devices and systems are developed and commercialized, aspects of the present invention contemplate their use.

The electrical measurement devices 110 and communication devices 115 may be included at various locations along the power transmission line or distribution conductor 105 within the power distribution system 100 and may include a plurality of devices effective to detect and communicate information regarding one or more falling conductors. For example, in some embodiments, the electrical measurement devices 110 and communication devices 115 may be installed at an end of a branch circuit, at control locations along the circuit, at locations of reclosers, and generally at any convenient measurement locations on the system that enable measurement of voltage and/or current characteristics of the conductive lines, both upstream and downstream to allow for determination of a signature or broken-conductor location. In another example, the electrical measurement devices are so positioned to ensure fast and accurate readings throughout the system and to quickly communicate, calculate, and deenergize, as necessary, a problem conductor or several problem conductors.

Each of the electrical measurement devices 110 may measure an electrical signal at a point along the power transmission line or distribution conductor 105 and transmit such information via communication devices 110 to another electrical measurement device, a control device, or any other receiving device within the power transmission or distribution network, or a device residing elsewhere in the utility infrastructure or enterprise. In some examples, a combination measurement device and communication device, such as a manufactured single device with functions or capabilities of both individual devices, is used along at least a part of the power transmission line or distribution conductor 105.

The power distribution system 100 may also include a controller (not shown). The controller may be configured to receive a signal indicating the occurrence of a falling conductor from one or more of the electrical measuring devices 100 and to trip or switch one or more of the closest breakers or switching devices to the signature location of the problem conductor, The controlled switching devices may include sectionalizing devices such as a recloser, a relay with its associated circuit breaker, or the like, The controller may also include a processor. In other examples, adjacent or nearby breakers or switching devices to the signature location of the problem conductor are tripped instead of or in addition to tripping the closest breakers or switching devices. The term "processor" refers to one or more programmable general-purpose or special-purpose microprocessors, digital signal processors (DSPs), programmable controllers, application specific integrated circuits (ASICs), programmable logic devices (PLDs), or the like, or a combination of such hardware devices. The processor may be configured to execute instructions to compare voltage signals, currents, or other signals, such as time-based signals, provided via the electrical measurement devices 110. As understood herein, the processor may include the function of a phasor data concentrator (PDC), or the PDC may include the processor function.

In some embodiments, the system may include other analysis devices that compare voltage and/or current signals at various circuit locations and/or detect voltage and/or current differences that may indicate a break of a circuit conductor between compared voltage or current sensor devices. Analysis devices at various locations on the circuit can sense different signals for monitoring purposes and can generate signals following the sensing step that indicates a status change. Examples of analysis devices include, but are not limited to, protective relays, recloser controls, phasor data concentrators, logic processors, vector data processors, programmable logic controllers, breaker controllers, meters or controls with programmable logic or logic designed for this particular task, voltage regulator or capacitor bank controllers, or a field or substation measurement or control device specifically designed or programmed for this function.

In one exemplary embodiment, the power distribution system may be operated as follows:

In the time before the conductor break:

1. Every 2 power cycles (33 ms), each electrical measurement device 110 on the circuit 90 (for example, a recloser control unit with phasor measurement unit (PMU) capability included) completes a set of three phase voltage and current measurements with phase relationships included. This stream of measurements is thus gathered 30 times per second, and comprises, for example, one or more of the following:

a) Phasor measurements (filtered power-frequency components) of each of the three phase voltages, with phase angle for each based on a time tag that identifies phase position with a precision on the order of one microsecond.
 b) Phasor measurements of each of the three phase currents, with phase angles of each as for voltages.
 c) Individual phase real power magnitude and direction (watts).
 d) Individual phase reactive power magnitude and direction (vars).
 e) Three-phase real and reactive circuit power flow based on positive sequence measurements of voltages and currents.
 f) Negative-sequence measurements of voltages and currents.
 g) Frequency.
 h) Rate of change of frequency (ROCOF).
 i) Status indications from controlled equipment—for example, a Boolean point that indicates that the primary power switching path of the controlled recloser is CLOSED or OPEN. Another example is a point indicating that the measurement system and its timing synchronization is healthy or has failed; yet another example is a point indicating that the measurement system has been placed in TEST MODE by a maintenance technician and is thus reporting test signal values rather than real power system measurements.
 j) A data packet publication time tag, whose time stamp may be different from the synchrophasor time tag associated with the measurements themselves.

Different types of measurement devices 110 may compile different lists of data in their communicated information packet streams. Those without PMU capability will measure voltages and currents without individual phase angle values as in (a) and (b) above; they can only measure the phase angle relationship between a local reference (e.g. the Phase A voltage) and the other measurements from that location.

2. Each measurement device 110 may also include capability for temporal data capture, such as for example an oscillographic record of what the voltage and current waveforms looked like for a recent captured time window of one second.

3. Using a communication device 115, each measurement device 110 transmits its calculated results in a continuous stream of data packets over the WiMax radio network to a controller 120z (FIG. 1) performing a comparison function at the distribution substation 130. The exchanged data may include a time tag indicating when the measurements were actually taken relative to a system based time marker. The time marker may optionally be based on a global standard like a received GPS time signal that enables PMU precise phase angle measurements and reference time tags. The communication transmission may instead be transmitted across a different format, such as 4G LTE, optical fiber paths, or other fast and reliable means.

4. The data packet with reference time tag arrives at the receiving controller 120z in the substation 130 less than 133 ms after the reported conditions were actually observed by the measurement devices. In some embodiments, a second controller is used to operate the detection and tripping system of the present disclosure in conjunction with the first controller, such as to divide the monitoring and controlling function across more than one controller. In other embodiments, the second controller is used as a backup for the first controller 120z, or referred to more generically as 120.

5. The receiving controller 120 compares the incoming time-tagged data values with those received from other measurement locations taken at approximately the same time, and may further include values measured at the substation end of the feeder. For example, in a section of the power distribution system 100, there may be four (4) measurement devices at points A, B, C, and D. If there is a conductor break somewhere in line section BC, as an example, the signal relationships between locations B and C will show a differential behavior immediately after the break that is uniquely characteristic of a disconnection between them. Measurement comparison between A and B will, by contrast show the behavior characteristic of a disconnection past B. Comparing C and D, both will show that the circuit is either dead or has characteristics of two points that are connected and energized only by distributed customer generation. Decoding and comparison of all values by the controller takes less than a power cycle—roughly under 17 ms.

6. If there is no broken conductor or problem conductor in the system, the substation controller 120z (FIG. 1) interprets the information as being consistent with normal power flow in each distribution circuit phase conductor, and at most only slightly changed from the last comparison made 33 ms earlier.

7. This value exchange and evaluation process may be repeated every 33 ms for all measuring devices 110 at all times. Normally, no reaction is produced.

When a phase conductor breaks or become separated, it can take approximately 1.2 to 1.5 seconds to hit the ground for a typical 30 foot above ground conductor. When this happens, the process can include:

8. Load current may continue to flow at decreasing magnitude for a time in the range of 100 ms, such as through the arc that establishes between the broken conductor ends.

9. After 100 ms, as the conductor ends separate, the series arc between them is extinguished and the circuit is interrupted. Current flow measurements, voltage measurements, and current-voltage relationships change at measurement devices both upstream and downstream from the break. These changes in measurements represent a change in condition through the relevant section of the system. A comparison of measurements across the break will show a dramatic change from pre-break measurements. For example, voltage and current measured at downstream measurement devices 110 may decrease and shift phase in comparison with voltage and current measured at upstream measurement devices. Historical values for the same measurement locations, sections or points will also change, which will provide further confirmation of the problem conductor.

10. 33 ms later, the next new set of computed values in the measurement devices 110 may reflect the changed voltages and current flow on the distribution circuit. 100 ms after that, the new measurements have been communicated from the measurement devices 110 to the substation controller (120z) via data packets over WiMax or other communication channels.

11. 17 ms later, the controller (e.g., 120z) has performed comparison calculations and has recognized the signature of a broken conductor. It may repeat this evaluation on another set of measurements to make sure the observation is confirmed to avoid an incorrect operation. This recheck may take another 33 ms—the time needed to receive the next series of measurement points. Alternatively or additionally, the readings or calculations may be compared to the same set of readings or calculations just prior to the moment of the conductor break to ascertain a change in condition.

12. The controller (e.g., 120z) may then issue a disconnection or deenergize control signal to its adjacent local circuit breaker or recloser. 50 ms later, the circuit breaker has interrupted all load current flow and completely deenergized the distribution circuit.

13. Deenergization of the circuit may thus occur approximately 333 ms after the physical occurrence of the break, as the conductor is in the process of falling.

14. Approximately one full second later, the dead conductor strikes the ground, posing no fire or electrocution risk.

Minimum Detection Criteria—Table 1

In one example, a falling conductor detection method uses an upstream voltage reading and a downstream voltage reading and can have signals shown in the table on the next page.

Note 1: The trigger criterion—the required condition for a suspected breaking conductor is the downstream voltage collapse shown as legend or superscript #1.

Notes 2 and 3: The discriminant criterion—to distinguish between breaking conductors and fault-induced voltage drop—are shown with legend or superscript #2 and legend or superscript #3 respectively.

Notes 4 and 5: The discrimination may be sharpened by the joint consideration of upstream currents—shown with legend or superscript #4 for break confirmation and legend or superscript #5 for fault conditions that are not breaks.

TABLE 1

Falling conductor detection with no distributed energy resource (DER)

| | Upstream of fault or break | | | Downstream of fault or break | | |
|---|---|---|---|---|---|---|
| | Current pulse | Voltage pulse | Other indicator | Current pulse | Voltage pulse | Other indicator |
| Fault on lateral that blows fuse | Strong Increase$^5$ | Decrease or collapse$^3$ | V/I phase angle goes from load to fault value. Recloser controls and relays time (5) | No measurement available; or decreases/goes close to zero | Strong decrease or collapse$^1$ | N/A |
| Fault on branch that operates recloser | Strong Increase$^5$ | Decrease or collapse$^3$ | V/I phase angle goes from load to fault value. Recloser controls and relays time (5) | Decreases/goes close to zero | Strong decrease or collapse$^1$ | None |

TABLE 1-continued

Falling conductor detection with no distributed energy resource (DER)

| | Upstream of fault or break | | | Downstream of fault or break | | |
|---|---|---|---|---|---|---|
| | Current pulse | Voltage pulse | Other indicator | Current pulse | Voltage pulse | Other indicator |
| Fault on feeder that operates substation breaker | Strong Increase[5] | Decrease or collapse[3] | V/I phase angle goes from load to fault value. Relays times (5) | Decreases/goes close to zero | Strong decrease or collapse[1] | None |
| Fault on adjacent feeder circuit or in substation source | Decrease, moderate to large[5] | Decrease or collapse[3] | None | Decrease, moderate | Some decrease or collapse[1] | None |
| Open conductor on lateral | No change or small decrease[4] | No change or small increase[2] | None | No measurement available; or decreases/goes close to zero | Strong decrease or collapse[1] | N/A |
| Open conductor on branch | No change or some decrease[4] | No change or small increase[2] | None | Decreases/goes close to zero | Strong decrease or collapse[1] | None |
| Open conductor on main feeder | No change or some decrease[4] | No change or small increase[2] | None | Decreases/goes close to zero | Strong decrease or collapse[1] | None |

While the example presented above collects all data at the substation controller 120z to evaluate and if necessary trip the entire circuit, in some embodiments, the controller 120z can determine in the same time frame where the break or problem conductor has occurred (between two measurement points) and can send a control signal to the closest adjacent switching device(s) or the closest recloser(s) to trip. This may reduce the number of customers affected by the problem conductor to a smaller number than if a larger section of the circuit was to trip. Since it may require another 100 ms of outbound tripping communications time to trip the nearest or nearby switching device(s) or recloser(s), this extra time can still be accomplished comfortably within the available time before the conductor hits the ground.

In some embodiments, the comparison may be performed within the measuring devices 110 themselves as they exchange value packets over the meshed radio or communication network. The measuring devices may in turn send a control signal or signals to the closest adjacent device(s) to trip the circuit breaker or recloser. In other examples, to deenergize a larger with a buffer zone, nearby or proximately located devices may be tripped without having to trip the closest device or in addition to tripping the closest devices. In the present embodiment, the substation device 120z is acting as another control device like the feeder circuit devices 120a. For example, the substation control device 120z may compare its measurements with those from the measurement device 110a embedded within the recloser 125a, may detect a conductor break between the substation and recloser 125a, and can then disconnect the feeder by tripping the substation breaker 125a.

Figure 2:
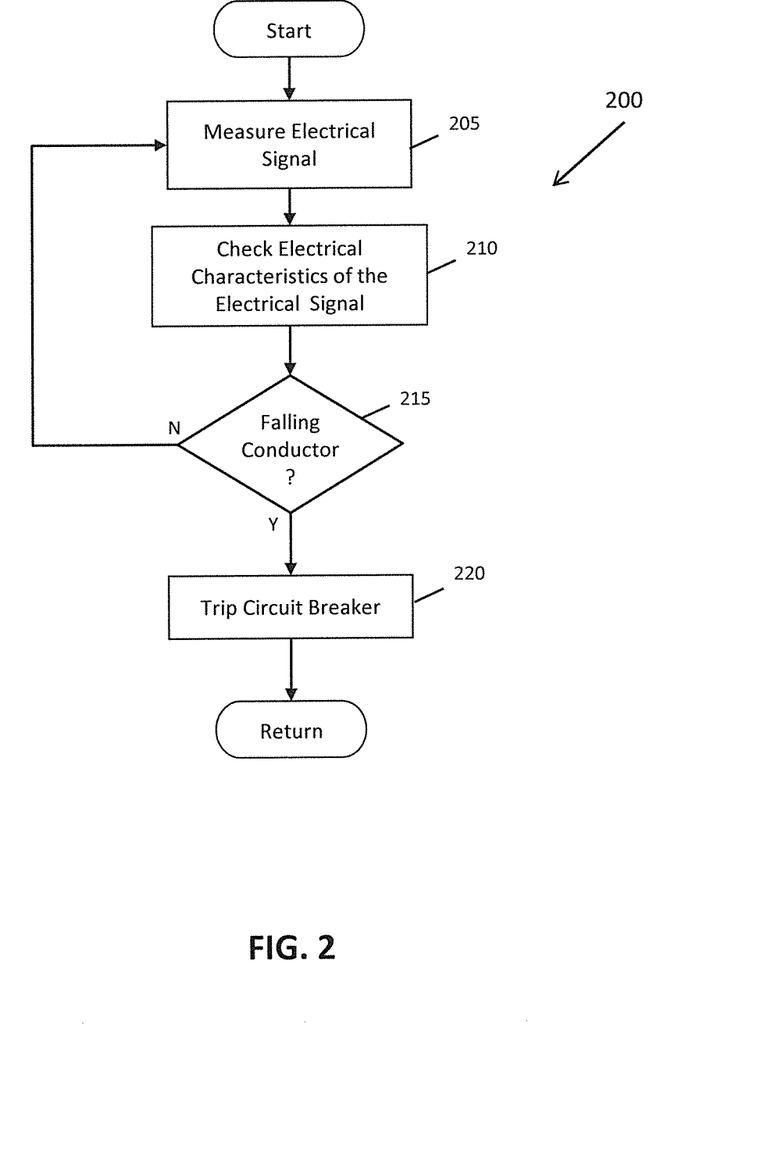
FIG. 2 is a flow diagram of a process for detecting a falling conductor in accordance with aspects of the invention.

FIG. 2 is a flow diagram illustrating a process 200 according to one embodiment of the present disclosure. As shown, at block 205, the process measures electrical signals at various locations in the power distribution system.

At block 210, the process 200 checks the electrical characteristics of the measured electrical signal taken by the various electrical measurement devices. The electrical characteristics may comprise for example, the current or voltage of the electrical signal. In some embodiments, the measured electrical signal may be compared to a threshold value. For example, during the summer months when fire hazards are at their greatest, a threshold value can be established to trip the circuit even if that value or signature may be less clearly indicative of a downed conductor.

At block 215, the process determines whether a conductor break has occurred based on the comparison to the predetermined threshold value, to some established abnormal voltage or current signatures, to a change in value or signature based on prior reading or a series of prior readings, or based on prior historical data. When no conductor break has occurred, the process returns to block 205 and continues to monitor the transmission line or distribution circuit. On the other hand, when the comparison of the electrical characteristics of the electrical signal to the predetermined threshold, for example, indicates that a problem conductor exists, the process determines if the signature is accompanied by that of a commonly-occurring short-circuit fault. If so, the process returns to block 205 and continues to monitor the transmission line. If the signature of a short-circuit fault is not detected, the process has detected a falling conductor, and continues to block 220 to trip a circuit breaker upstream of the problem conductor. Alternatively, the electrical measuring device may provide a trip signal to a communication device, which may send the trip signal to one or more circuit breakers or switching devices that are adjacent or proximate the problem conductor to deenergize the falling portion of the transmission line or distribution circuit. In other embodiments, several line sections that are remote from the detected problem conductor may be deenergized as a precaution. This allows the electricity provider to safely deenergize a larger area than necessary, such as a buffer area, to ensure any potential problem conductor that falls within the buffer area is safely deenergized.

In some embodiments, the process may further classify the apparent break that has occurred and utilize the classification information to determine the actions or steps to be taken. For example, when the signature is localized (e.g., a falling power line), the trip signal may be sent to a circuit breaker adjacent to the signature to trip. However, when the signature affects a broad area or a highly dense area, the trip signal may be sent to a circuit breaker at a distribution substation or other remote site to trip the broader area. In yet other examples, the signals may be sent to remote switches to deenergize to ensure a relatively large buffer area but less than tripping the whole circuit. In still other examples, trip signals may be sent to multiple circuit breakers, switching devices, or reclosers that are adjacent the section of the circuit measured with the signal indicative of a problem conductor to trip. This will in effect trip broader sections of the circuit adjacent the problem section.

Thereafter, the process returns.

Figure 3:
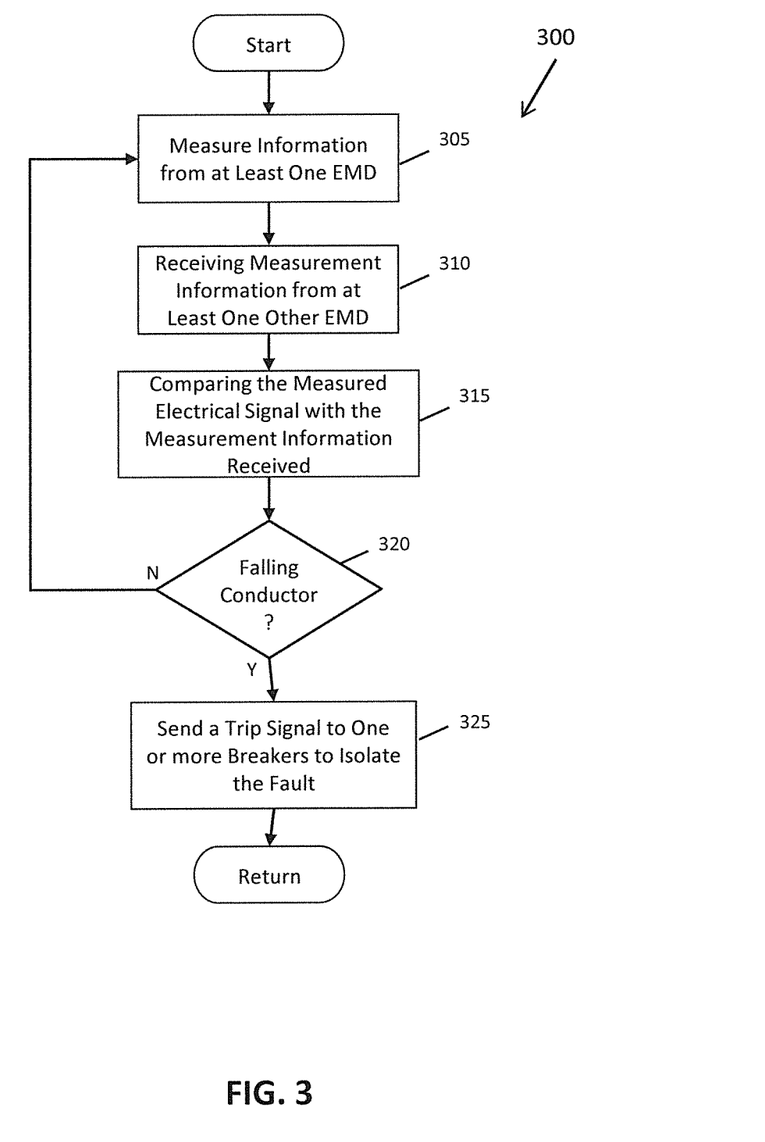
FIG. 3 is a flow diagram of a process for detecting a falling conductor in accordance with aspects of the invention.

FIG. 3 is a flow diagram illustrating a process 300 for detecting a falling conductor in accordance with aspects of the present invention, which includes system, device, and method for detecting a signature indicative of a conductor line break or separation in a power distribution circuit before the conductor line hits the ground. The method preferably includes mechanisms for deenergizing the falling conductor line before it hits the ground. At block 305, the process measures an electrical signal, such as voltage and/or current characteristics of a conductor. A first electrical measurement device detects electrical characteristics of the electrical signal at a location along a conductor in a power distribution system. In a preferred embodiment, pluralities of electrical measurement devices are installed throughout the power distribution grid for detecting electrical signal from different sections of the power distribution system. In some embodiments, the electrical characteristics may be measured at predetermined intervals, such as every 33 milliseconds, for example. In other examples, the interval is less frequent and less preferred, such as every 1 second. In some embodiments, the measurements may be taken upon receiving instructions from a controller.

At block 310, the process receives measurement information from at least one other electrical measurement device, such as from a second EMD in the electrical power distribution system. The measurement information may include electrical characteristics of an electrical signal as measured at another location in the power distribution system by the second electrical measurement device. The measurement information may be received by the first EMD and sent by the second EMD via a communication device, such as communication device 115 shown in FIG. 1.

At block 315, the process compares the measured electrical signal with the received measurement information at the first EMD. In some examples, both the first and the second electrical measurement devices perform the comparison. In other examples, the information and data are sent to the controller 120 to perform the comparison. In still other examples, any particular EMD will compare its own measurement information with information from an adjacent EMD in one direction or with adjacent EMDs in both directions.

At block 320, the process determines whether there is a falling conductor based on the comparison. In some embodiments, a falling conductor may be determined when the difference between the electrical characteristics of the measured electrical signal and the electrical characteristics included in the received measurement information exceeds a predetermined threshold. In other examples, the value or trigger point for determining whether there is a problem conductor is derived from voltage and/or current signatures, graphs, phase angles, and/or other parameters that exceed certain predetermined ranges, such as time-based behavior or characteristics. If a falling conductor has not been detected, the process returns to block 305 and repeats.

At block 325, if a falling conductor is detected, a trip signal is sent to one or more breakers, switching devices, or reclosers adjacent to the problem conductor to deenergize it before the conductor hits the ground. In other examples, a trip signal is sent to two or more breakers, switching devices, or reclosers remote from the signature to trip and to form a buffer area or zone by tripping a larger section of the circuit than just the problem conductor. The electrical characteristics of the measured electrical signal and the received measurement information may be used to identify the location of the falling conductor and determine one or more circuit breakers which may be switched to effectively deenergize the falling conductor and reduce the threat posed to persons or animals in the vicinity.

Figure 4:
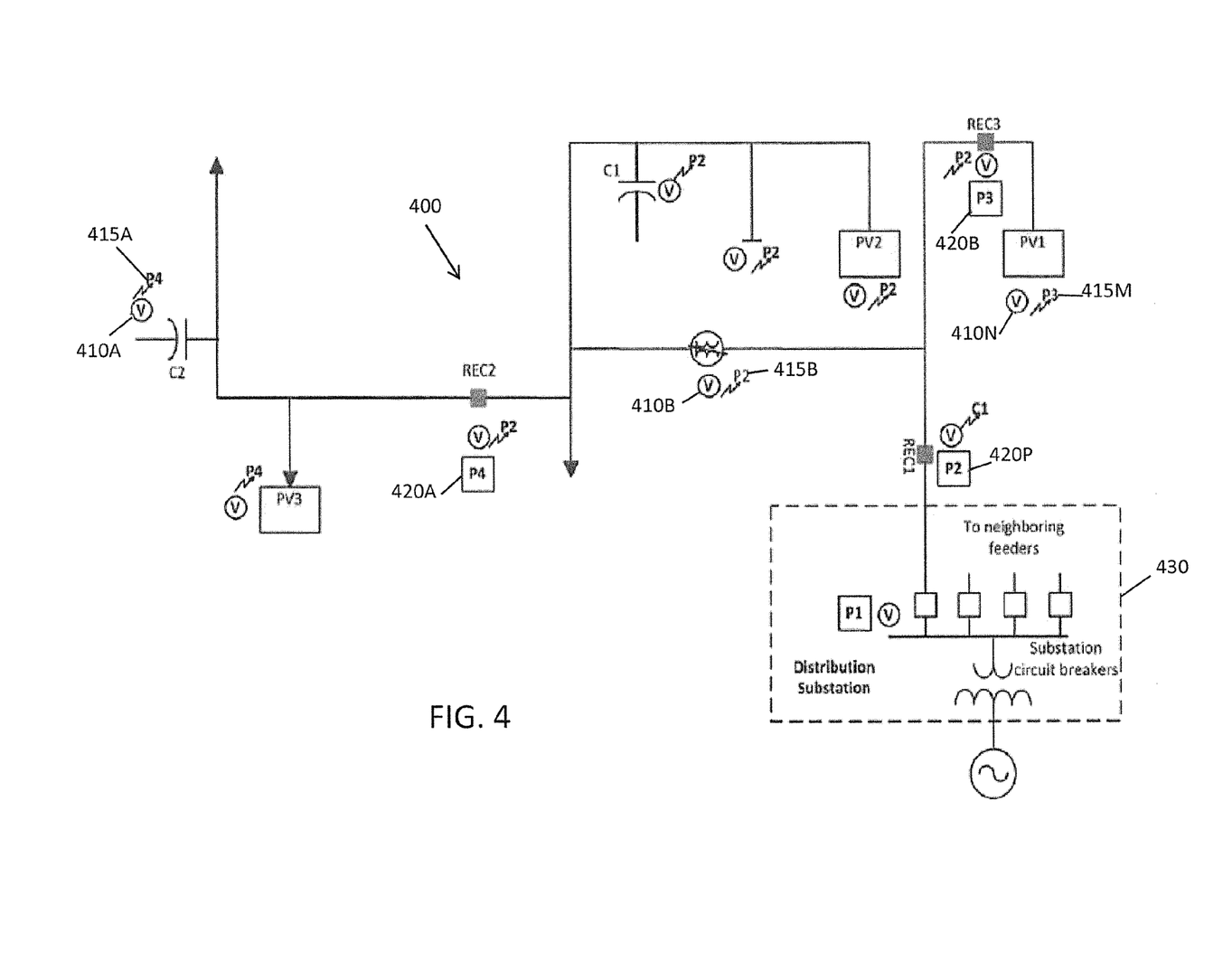
FIG. 4 is an exemplary block diagram of a power distribution system in accordance with aspects of the invention.

FIG. 4 is a diagram of an exemplary power distribution system 400 in accordance with aspects of the present invention. As shown in FIG. 4, the power distribution system 400 includes a plurality of voltage and/or current sensing devices 410A, B, . . . N, where N represents a whole integer greater than 1, and a plurality of communication devices 415A, B . . . M, where M represents a whole integer greater than 1. The voltage and/or current sensing devices may generically be referred to as 410 and the communication devices may generically be referred to as 415. Each of the voltage or current sensing devices 410 may include instrument transformers or other devices for measuring electrical characteristics of a signal from an energized high voltage power circuit conductor. For example, in some embodiments, the electrical measuring devices may comprise a potential transformer, a current transformer, a distribution power transformer, a capacitive divider, a resistive divider, a capacitive potential device, a dielectric optical sensor, a phasor measuring unit (PMU), communicating protective relay, communicating recloser controller, voltage regulator, capacitor bank controller, a power quality meter, revenue meter, or any other voltage and/or current sensing device.

The voltage and/or current sensing devices 410 may be configured to measure a voltage signal and compare the measured voltage signal to a voltage threshold. Further, the voltage sensing device may be configured to generate a trip signal when the measured voltage signal is below the threshold voltage signal, or, depending how the determination is made or set, when the measured voltage signal is above the threshold voltage signal. For example, in some embodiments, the voltage and/or current sensing devices 410 may generate a trip signal when the measured voltage is less than 80% of a normal operating voltage. In some embodiments, the voltage sensing devices 410 may generate a trip signal when the measured voltage is below the threshold voltage for a period of time. For example, voltage sensing devices 410 may generate a trip signal when the measured voltage is less than 80% for at least 0.16 seconds or some other threshold to be established. Thus, aspects of the present system and method include ascertaining a voltage signature and a time duration before a signature in the conductor line is determined.

The communication devices 415 may comprise a point-to-point radio or any high speed communication device configured to communicate via a wireless data network, wired Ethernet, serial communication network, or optical fiber network.

The voltage sensing devices 410 and communication devices 415 may be included at various locations within the power distribution system 400 and may include a plurality of devices effective to detect and communicate information about the one or more down conductors. As shown in FIG. 4, the voltage sensing devices 410 and communication devices 415 may be installed at an end of a branch circuit. Although FIG. 4 shows the voltage sensing devices 410 and communication devices 415 both located at each branch or lateral circuit, the number and arrangement of these components is exemplary and not limiting.

The power distribution system 400 also includes controllers 420 A-P (which may be referred to generically as controllers 420). The controllers 420 may include intelligent measuring devices such as a phasor measurement unit (PMU), phasor data concentrator (PDC), a recloser controller, a relay or the like. Each of the controllers 420 may be configured to receive communicated measurements or status indications from other intelligent measuring devices or other controllers and can send commands to breakers or switching devices upstream or downstream of a problem conductor to trip or deenergize. The controller 420 may further include a processor (not shown). The term "processor" refers to one or more programmable general-purpose or special-purpose microprocessors, digital signal processors (DSPs), programmable controllers, application specific integrated circuits (ASICs), programmable logic devices (PLDs), or the like, or a combination of such hardware devices. The processor may be configured to execute instructions to compare voltage signals provided via the voltage sensing devices 410 and may be installed at the substation. In other examples, the processor may compare or execute instructions to compare current signals, phase relationships, or time behavior for determining a measurement just before the apparent event and a measurement just after the apparent event, as examples.

In some embodiments, the system 400 may include other analysis devices that compare voltage and/or current signals at adjacent or remote circuit locations, detect voltage and/or current differences which may indicate a break of a circuit conductor between compared electrical sensor devices, and/or phase, graph, wave, or other electrical characteristics. Examples of analysis devices include but are not limited to protective relays, recloser controls, phasor data concentrators, logic processors, vector data processors, programmable logic controllers, breaker controllers, meters or controls with programmable logic or logic designed for this particular task, or a field or substation control device specifically designed or programmed for this function.

In operation, a voltage sensing device 410N detects a voltage which is below a predetermined threshold value. The voltage sensing device 410N generates an electrical change signature signal and sends that signature signal to a controller 420 (e.g., 420P) to indicate a problem conductor, which is adjacent to the voltage sensing device via communication device 415M. After receiving the signal, controller 420P switches a breaker just adjacent to the problem conductor to disconnect the remainder of the circuit.

In some embodiments, the electrical change or trip signal may be sent to each of the adjacent controllers 120, adjacent to the detected signature. In some embodiments, the electrical change or trip signal may be sent to controllers positioned at one or more distribution substations (e.g., 430).

In some embodiments, the voltage and/or current sensing devices 410 may send their respective electrical measurements to adjacent controller devices 420 or measurement devices where voltages or other signals can be compared. If the voltage or other signal comparison shows a break (e.g., a calculated or compared value indicative of a break or a value that exceeds a threshold value), the adjacent controller device may trip one or more breakers or reclosers to isolate the falling conductor at that point.

In some embodiments, the voltage measurements for each voltage sensing device 410 may be sent to substation 430 or to some other remote collection point, where all the voltage readings may be compared to determine whether there is a falling conductor in the system. Additionally, following a determination of a problem conductor, the substation or remote collection point may also determine a location of one or more switching devices or substation location closest to the break. Thereafter, the substation or remote collection point may send a signal to the one or more located switching devices or substation to thereby trip one or more breakers to deenergize an entire feeder.

Figure 5:
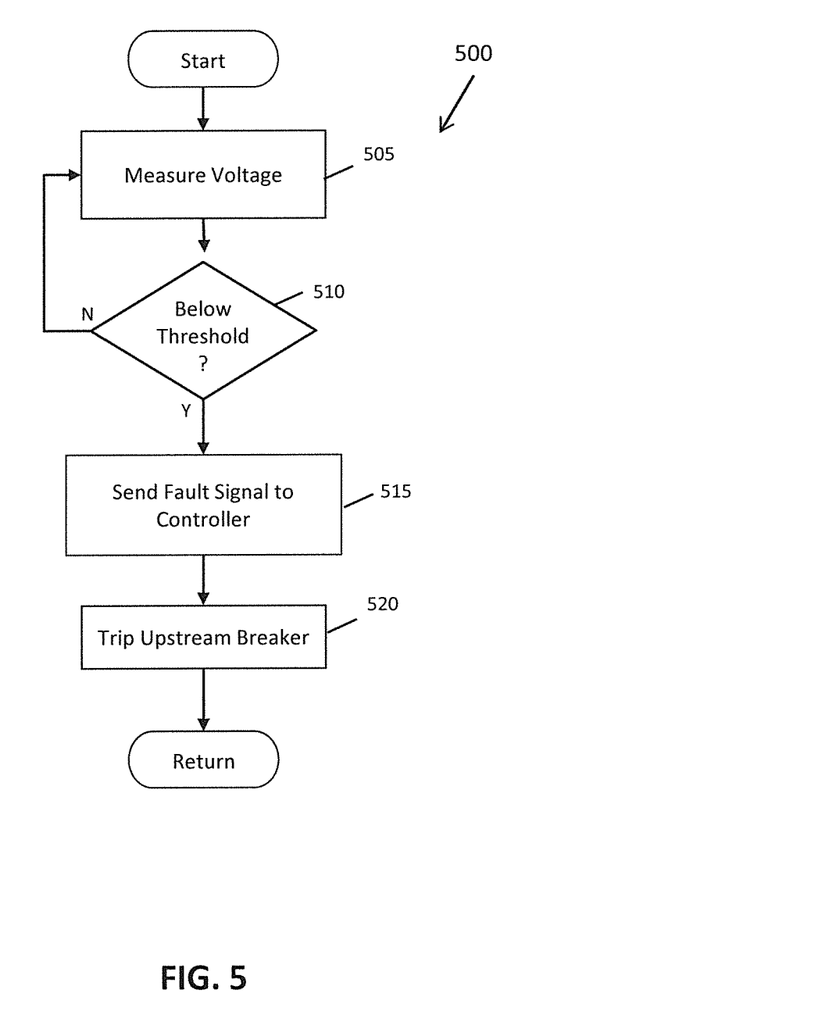
FIG. 5 is a flow diagram of a process for detecting a signature using a downstream electrical measurement device in accordance with aspects of the invention.

FIG. 5 is a flow diagram illustrating a process 500 according to another embodiment. At block 505, the process measures a voltage measurement at a designated point in a power distribution system. The voltage measurement may be detected by a voltage sensing device which may be located at various points in a power distribution system.

At block 510, the process determines whether the detected voltage measurement is below a predetermined threshold. The voltage sensing device may be configured to compare the measured voltage measurement to a predetermined threshold. In some embodiments, the voltage sensing device may send the measured voltage to a controller or other analytic device that may perform the comparison.

When the measured voltage is below a threshold voltage, at block 515, the process sends a trip signal to a controller. The voltage sensing device may generate a trip signal which may be sent to the controller via a communication device. In some embodiments, a controller or analysis device may be used to generate and send the trip signal to an upstream controller.

On the other hand, when the measured voltage is above the threshold, the process returns to block 505 and continues to measure the voltage at the designated position.

At block 520, the process trips an upstream breaker, upstream of the signature, to disconnect power devices downstream of that breaker. In some embodiments, the upstream breaker may include trip wiring or other device to initiate opening a power switching device (substation power circuit breaker or recloser on the circuit) to rapidly deenergize the broken-conductor circuit. In alternative embodiments, such as where the distribution circuit may be fed from multiple substations or energy sources, breakers or switching devices both upstream and downstream of the broken conductor may be deenergized.

Thereafter, the process returns.

Figure 6:
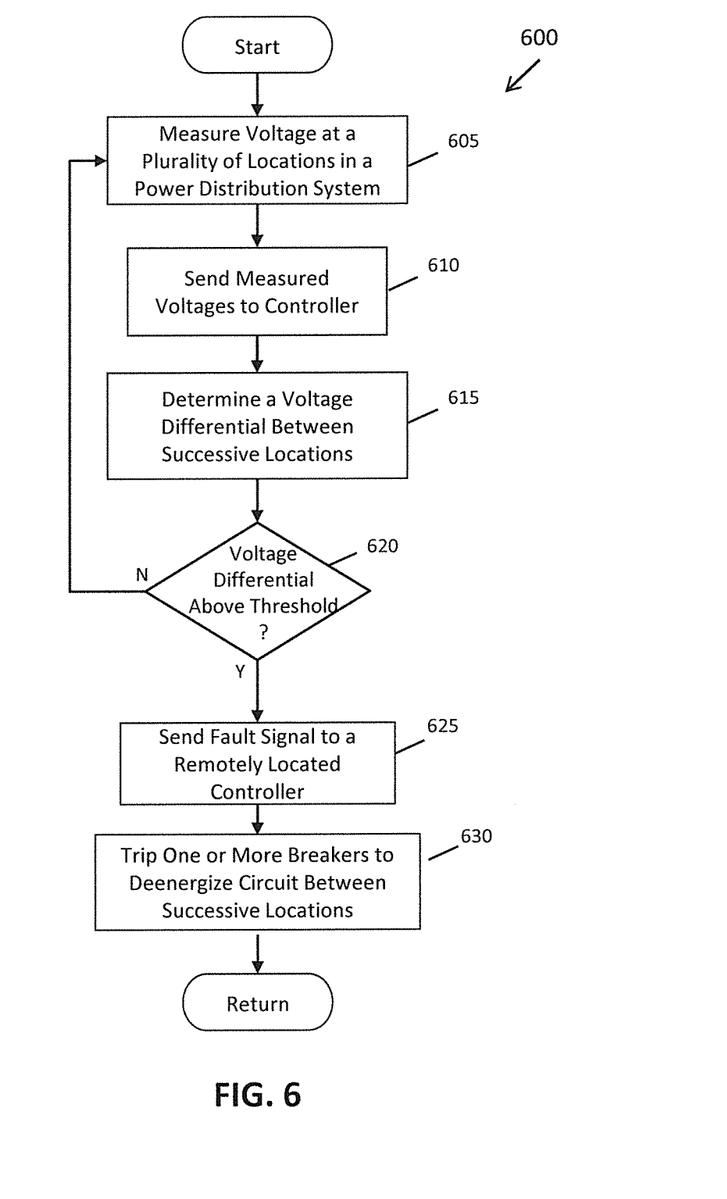
FIG. 6 is a flow diagram of a process for detecting a signature using one or multiple sensors in a power system with one or more sources of energy, in accordance with aspects of the invention.

FIG. 6 is a flow diagram illustrating a process 600 for detecting a falling conductor using a plurality of voltage sensors in accordance with another embodiment. At block 605, the process measures voltage readings at a plurality of locations in a power distribution system. The power distribution system may include a plurality of voltage sensor devices 410. Each of the voltage sensing devices may measure a voltage. In other examples, the measuring devices read or measure different electrical values, such as current values, or signals with phase angle values.

At block 610, the process sends the measured voltages to a controller. Each of the voltage sensor devices may send their voltage measurements to a controller 420 via communication devices 415. In some embodiments, the voltage sensing devices 410 may each be configured with a communication device and may send the voltage information directly to controller 420.

In some embodiments, the voltage sensing devices may send the measured voltage information to an analysis device in a substation of the power distribution system or to other remote analysis device. In still yet other embodiments, signal comparison can be performed at the measuring devices.

At block 615, the controller determines a voltage differential between successive locations of voltage sensing devices.

At block 620, the process determines whether the voltage differential is above some threshold value, which can be set by the utility provider. When the voltage differential is below the threshold, the process returns to block 605 and continues to measure voltages at each of the plurality of locations.

On the other hand, when the voltage differential is above the predetermined threshold value, at block 625, the process sends a trip signal to a controller which is upstream of the successive locations, to initiate a trip.

At block 630, the process trips a breaker located upstream of the successive locations.

Thereafter, the process returns.

Figure 7A:
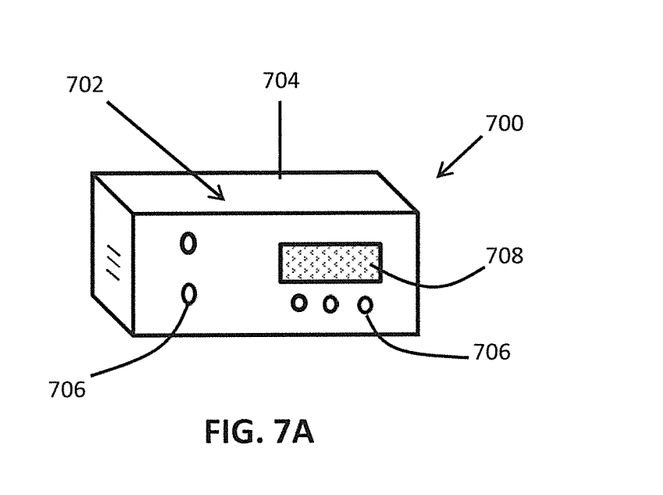
FIGS. 7A and 7B are schematic front and rear perspective drawings, respectively, of a control box usable with the system of the present disclosure.
Figure 7B:
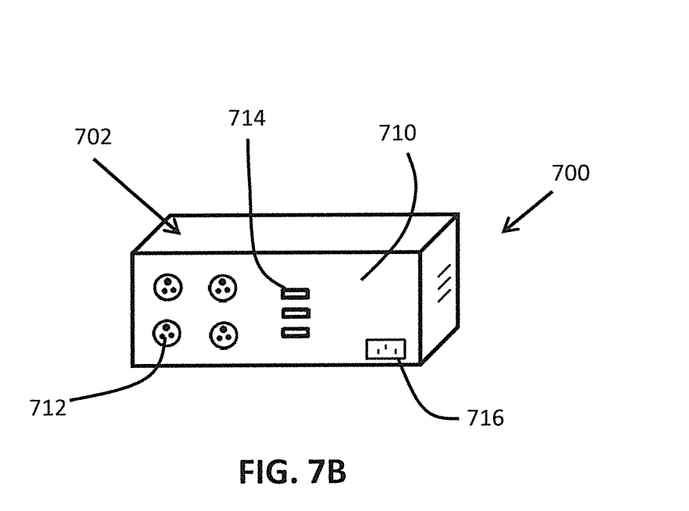

With reference now to FIGS. 7A and 7B, a perspective front view and rear view, respectively, of a control box or control device provided in accordance with aspects of the present disclosure is shown, which is generally designated 700. The control box 700 is configured for use in at least one of an electrical transmission system and a distribution system. For example, the control box or control device 700 may be positioned in the substation 130 of FIG. 1 for use with the power distribution circuit 90 of the system 100 of FIG. 1 or elsewhere as shown and described with reference to FIGS. 2-6. In one example, the control box 700 comprises a housing 702 having an enclosure 704 enclosing a plurality of electronic circuitries, such as circuit boards, integrated chips with a programmable processor, a flash memory, a hard drive, resistors, graphics cards, Ethernet cards, a communication device or module, either wireless or wired, to send and receive signals, etc. The control box 700 may include switches or control knobs 706 for selectively controlling different programmable functions, which are displayable on a display screen 708. The programmable processor is located in the housing and is programmed to receive a status change signal from a remote communication device. The status change signal may be gathered from one or more EMDs mounted throughout a distribution system or transmission system for measuring signals indicative of a problem conductor.

The programmable processor is further programmed to evaluate whether the status change signal represents a problem conductor. If the status change signal is determined to have value or values indicative of a problem conductor, the programmable processor is programmed to send a command to the communication device to emit a disconnect signal to one or more switching devices located on the transmission system or distribution system to deenergize the affected portion of the system before a problem conductor contacts the ground. At a different surface of the housing 702, such as the rear or back side 710 of the housing, one or more ports 712, 714, 716 are provided for connecting wires, cables, input devices, output devices, or combinations thereof. For example, the housing may have a power input port 716, a USB port 714, an electrical Ethernet network port 712. In other non-limiting examples, the ports can include: connections for an optical fiber network or for a serial data communication network, or a connection to a radio-based data communication system, etc.

In an alternative embodiment, the programmable processor in the control box 700 may be programmed to perform (a) a comparison function of a signal from a first location at time one and a signal from the first location at time two or (b) a comparison function of a signal from a first location and a signal from a second location, the second location being in any direction with respect to the first location. The signals at the first location and at the second location may be measured signals or computed signals from one of the EMDs discussed elsewhere herein. The programmable processor is further programmed to evaluate changes at time one and time two or changes between the first location and the second location to determine if a problem conductor is present. If a problem conductor is determined to be present in the monitored distribution or transmission circuit, the programmable processor is programmed to send a command to the communication device to emit a disconnect signal to one or more switching devices to deenergize the affected portion of the system before the problem conductor contacts the ground.

In a further aspect of the present disclosure, two control boxes are provided, which may be called a first control box and a second control box. The first control box may be used to monitor signals and the second control box may be used to control signals in at least one of an electrical transmission system and a distribution system. The programmable processor of the first box may be programmed to receive a status change signal from a communication device, which may send information gathered by an electrical measurement device discussed elsewhere herein. The programmable processor of the first box may further be programmed to evaluate whether the status change signal represents a problem conductor and to emit an affirmative signal of a problem conductor so that the emitted signal may be used to operate a switching device.

The programmable processor of the second control box may be programmed to receive the affirmative signal of a problem conductor from the first control box. The programmable processor of the second control box may further be programmed to emit a disconnect signal to one or more switching devices to deenergize the affected portion of the system before a problem conductor contacts the ground. The first and second control boxes may be at the same location or at different locations. If they are at different locations, the two control boxes can exchange signals through communications ports, such as through ports 712 in FIG. 7B. The two control boxes can also communicate wirelessly via internally or externally equipped communication modules.

Although limited embodiments of problem conductor detection and circuit deenergization systems and methods and their components have been specifically described and illustrated herein, many modifications and variations will be apparent to those skilled in the art. For example, the various measurement devices and communication devices may vary with different manufacturers and installed locations within the power transmission or distribution network, etc. Furthermore, it is understood and contemplated that features specifically discussed for one set of detection and deenergization system and method may be adopted for inclusion with other detection and deenergization systems and methods, provided the functions are compatible. Accordingly, it is to be understood that the detection and deenergization systems and methods and their components constructed according to principles of the disclosed device, system, and method may be embodied other than as specifically described herein. The disclosure is also defined in the following claims.

The invention claimed is:

1. A system for detecting a falling conductor in a power transmission or distribution system comprising:
   a conductor carrying voltage,
   an electrical measurement device in electrical communication with the conductor to measure an electrical characteristic of the conductor at a location in the power transmission or distribution system to determine whether the measured electrical characteristic is indicative of the conductor separating from the power transmission or distribution system;
   a communication device to send a signature indicative of the falling conductor to a control device; and
   wherein the control device is programmed to send a signal to activate one or more switching devices to deenergize the falling conductor in a time before the conductor contacts a ground surface.

2. The system of claim 1, wherein the electrical characteristic is voltage.

3. The system of claim 1, wherein the electrical characteristic is current.

4. The system of claim 1, wherein the measured electrical characteristic is below a predetermined threshold value, which is indicative of a falling conductor.

5. The system of claim 1, wherein the electrical measurement device is located on a fused branch.

6. The system of claim 5, wherein the electrical measurement device detects a falling conductor when the measured electrical characteristic indicates a decreased voltage for a predetermined period of time.

7. The system of claim 1, wherein the communication device is at least one of a wired communications network, a wireless network, a radio network, a set of links comprising a network, a packet-based or Ethernet data network, and a time-division multiplexed (TDM) serial network.

8. The system of claim 1, wherein the control device includes at least one of a circuit breaker, a distribution recloser, and a circuit switcher.

9. The system of claim 1, wherein the electrical characteristic is one of a phase relationship and time behavior for determining a measurement just before an apparent event and a measurement just after the apparent event.

10. A method for detecting a falling conductor in a power distribution system, the method comprising:
   detecting a falling conductor based on an electrical signature measured at a location on the circuit experiencing the falling conductor; and
   transmitting the electrical signature or a status change signal indicative of a line break signal to one or more control devices in locations where they can deenergize the falling conductor before the falling conductor contacts a ground surface.

11. The method of claim 10, further comprising activating one or more circuit breakers located where they can deenergize the falling conductor before the falling conductor contacts the ground surface.

12. The method of claim 10, wherein any of the control devices is a recloser, a switch or a circuit breaker.

13. The method of claim 10, wherein the transmitting is performed by a control device at a substation.

14. A system for detecting a problem conductor with an electrical measurement device on the circuit comprising:
   a sensor device to measure an electrical signature at a location in a power distribution system and to determine whether the measured electrical signature is below a predetermined threshold;
   a computing device to generate a status change signal based on the measured electrical signature being below the predetermined threshold; and
   a communication device to send the status change signal to a control device, which is located where it is able to disconnect the portion of the system for which the sensor device measures the signature.

15. The system of claim 14, wherein the predetermined threshold is indicative of a falling conductor and the control device receives the status change signal and controls one or more switching devices to disconnect power to the affected portion of the system before the falling conductor contacts a ground surface.

16. The system of claim 14, wherein the sensor device comprises a protective relay.

17. The system of claim 14, wherein the sensor device comprises a recloser control device.

18. The system of claim 14, wherein the sensor device comprises a phasor measurement unit.

19. A system for detecting a problem conductor with a voltage sensor on a circuit comprising:
   a voltage sensor device to measure a voltage at a location in a power distribution system and to generate a status change signal when the measured voltage is below a predetermined threshold voltage value;
   a communication device coupled to the voltage sensor device to at least one of receive and transmit the status change signal; and
   a controller to receive the status change signal from the communication device and to control one or more switching devices to disconnect power to a portion of the system of the problem conductor.

20. The system of claim 19, wherein the status change signal is indicative of a falling conductor and the controller receives the status change signal and controls one or more switching devices to disconnect power to the affected portion of the system before the falling conductor contacts a ground surface.

21. The system of claim 19, wherein the voltage sensor comprises a protective relay.

22. The system of claim 19, wherein the voltage sensor comprises a recloser control device.

23. The system of claim 19 wherein the voltage sensor comprises a phasor measurement unit.

24. A control box for use in at least one of an electrical transmission system and a distribution system comprising:
   a housing having an enclosure and enclosing a plurality of electronic circuitries;
   a programmable processor located in the housing and programmed to:
      receive a status change signal from a communication device;
      evaluate whether the status change signal represents a problem conductor; and
      emit a disconnect signal to one or more switching devices to deenergize the affected portion of the system before a problem conductor contacts the ground; and
   one or more ports associated with the housing for connecting wires, cables, input devices, output devices, or combinations thereof.

25. The control box of claim 24, further comprising a communication module for sending and receiving signals or data.

26. A control box for use in at least one of an electrical transmission system and a distribution system comprising:
   a housing having an enclosure and enclosing a plurality of electronic circuitries;
   a programmable processor located in the housing and programmed to:
   perform (a) a comparison function of a signal from a first location at time one and a signal from the first location at time two or (b) a comparison function of a signal from a first location and a signal from a second location, the second location being in any direction with respect to the first location;
   evaluate changes at time one and time two or changes between the first location and the second location to determine if a problem conductor is present; and
   emit a disconnect signal to one or more switching devices to deenergize the affected portion of the system before a problem conductor contacts the ground; and
   one or more ports associated with the housing for connecting wires, cables, input devices, output devices, or combinations thereof.

27. The control box of claim 26, further comprising a communication module for sending and receiving signals or data.

28. A system comprising a first control box for monitoring signals and a second control box for controlling signals in at least one of an electrical transmission network and a distribution network, the system comprising:

a first housing having an enclosure and enclosing a plurality of electronic circuitries;
   a programmable processor located in the first housing programmed to:
      receive a status change signal from a communication device;
      evaluate whether the status change signal represents a problem conductor; and
      emit an affirmative signal of a problem conductor; and
   one or more ports associated with the first housing for connecting wires, cables, input devices, output devices, or combinations thereof; and
a second housing having an enclosure and enclosing a plurality of electronic circuitries;
   a programmable processor located in the second housing programmed to:
      receive an affirmative signal of a problem conductor; and
      emit a disconnect signal to one or more switching devices to deenergize the affected portion of the system before a problem conductor contacts the ground; and
   one or more ports associated with the second housing for connecting wires, cables, input devices, output devices, or combinations thereof.

29. The system of claim 28, wherein the first box and the second box communicate with one another wirelessly or through connections with the one or more ports.

\* \* \* \* \*